United States Patent [19]

Knapp et al.

[11] 4,183,768
[45] Jan. 15, 1980

[54] ANATASE PIGMENT FROM ILMENITE

[75] Inventors: Donald E. Knapp; Gerard M. Sheehan, both of Savannah, Ga.

[73] Assignee: American Cyanamid Company, Stamford, Conn.

[21] Appl. No.: 554,796

[22] Filed: Mar. 3, 1975

[51] Int. Cl.² .............................................. C09C 1/36
[52] U.S. Cl. ...................................... 106/299; 106/300
[58] Field of Search ................................ 106/300, 299

[56] References Cited
U.S. PATENT DOCUMENTS

| | | | |
|---|---|---|---|
| 3,341,291 | 9/1967 | Mabbs et al. | 106/300 X |
| 3,459,576 | 8/1969 | Smith | 106/300 |
| 3,615,204 | 10/1971 | Libera et al. | 106/300 X |
| 3,617,217 | 11/1971 | Heywood et al. | 106/300 X |
| 3,625,650 | 12/1971 | Libera et al. | 106/300 X |
| 3,690,887 | 9/1972 | Dantro | 106/300 X |
| 3,709,710 | 1/1973 | Edgar et al. | 106/300 |

Primary Examiner—Delbert E. Gantz
Assistant Examiner—William G. Wright
Attorney, Agent, or Firm—Bruce F. Jacobs

[57] ABSTRACT

Titanium dioxide pigment of anatase crystal structure containing 0.05 to 0.3% $Nb_2O_5$, 0.4 to 0.6% $K_2O$, 0.8 to 1.2% $Sb_2O_3$, 0.2 to 0.4% $P_2O_5$ and the balance substantially $TiO_2$; the particles of said pigment having a surface coating of hydrous metal oxide, such as alumina. Such pigment is useful as a delustrant in synthetic fibers, such as cellulose acetate.

4 Claims, No Drawings

ANATASE PIGMENT FROM ILMENITE

This invention relates to a new and improved titanium dioxide pigment. More particularly, it relates to a titanium dioxide pigment of anatase crystal structure made from ilmenite containing niobium oxide having improved photochemical stability and improved reflectance, particularly in the shorter (blue and violet) wavelengths, achieved by the incorporation therein of critical minor amounts of certain additives in combination with a surface coating of hydrous metal oxide on the pigment particles.

Titanium dioxide is well known as a white pigment for many uses, among which is the use as a delustrant in synthetic fibers or filaments. Most of the pigmentary titanium dioxide commercially produced is made from ilmenite or titania slag by the sulfate process which can produce a product of either rutile crystal structure or anatase crystal structure. Rutile titanium dioxide pigments are more abrasive than anatase titanium dioxide pigments resulting in greater wear of equipment when rutile titanium dioxide pigments are used in the production of synthetic fibers or filaments. Accordingly, one object of the present invention is to produce improved titanium dioxide pigments of anatase crystal structure by the sulfate process for use in synthetic fibers and filaments.

The major portion of the world's production of titanium dioxide pigments is by the sulfate process, the raw materials for which are ilmenite or titania slag or mixtures thereof. Generally, the sulfate process involves digestion of the ore in concentrated sulfuric acid, dissolving the resultant digestion cake to form a slurry, clarifying and filtering the resulting solution, hydrolyzing to precipitate titania hydrolysate or hydrous titanium oxide, filtering and washing hydrolysate, calcining the hydrolysate, and finishing and grinding the pigment. Of course, numerous variations of this widely used commercial process exist. In addition to the minor amounts of impurities remaining from the raw materials, other additives may be added during the processing, generally immediately prior to calcination, which materials may affect properties of the calcined pigments so produced.

One such material, phosphorus as $P_2O_5$, serves to inhibit the formation of rutile crystal structure during calcination of the hydrolysate so as to maintain the pigment in the anatase form. Another such material, antimony trioxide, can affect the color of the anatase pigment and has a beneficial photolytic effect when the anatase form of $TiO_2$ is used as a fiber delustrant. However, when the raw material ilmenite ore contains niobium oxide impurity, which passes through the sulfate process to remain with the titanium oxide since it is difficult to separate, there is an interaction with the antimony oxide to produce an undesirable yellow coloration to the pigment. It is another object of this invention to produce anatase titanium dioxide pigments containing these additives which do not have this undesirable yellow coloration despite the presence therein of niobium oxide.

In accordance with the present invention, these objects, and others as will be apparent from the accompanying description, are achieved by preparing, using the sulfate process, a titanium dioxide pigment of anatase crystal structure containing 0.4 to 0.6% $K_2O$, 0.8 to 1.2% $Sb_2O_3$, 0.2 to 0.4% $P_2O_5$, and the balance substantially $TiO_2$ (which contains minor amounts of impurities still remaining from the raw materials used, such as 0.05 to 0.3% $Nb_2O_5$), the particles of said pigment having a surface coating of hydrous metal oxide, such as alumina, silica, titania, etc.

For a further explanation of this invention, reference is made to the following examples wherein all parts are by weight except as otherwise indicated.

COLOR-IN-OIL TEST PROCEDURE

In this test, a wet oil paste containing the titanium dioxide pigment to be evaluated is visually compared with wet oil pastes containing titanium dioxide pigment standards under standardized lighting conditions for brightness and color tones. A series of standard titanium dioxide pigments of various brightness values is utilized for comparison with the sample to be evaluated, which sample is assigned the brightness value of the standard is most nearly matches or an interpolated value if it falls between two standards. The sample is also assigned a tone value which describes the color and degree of tone compared to the standard. Thus, the color designations are=(same as standard), Bl (bluer than standard), Y (yellower than standard), or Br (browner than standard) and the degree of tone designations are 1 (trace), 2 (slight), 3 (moderate), and 4 (considerable). For evaluating anatase samples, anatase standards are utilized for preparing the wet oil pastes.

Each "standard" paste is prepared by mulling four grams of the appropriate titanium dioxide color standard pigment in about 2.0 to 2.8 milliliters of color oil, a 50/50 mixture of A.D.M. XX Refined Linseed Oil and Spencer-Kellogg Diamond K Soybean Oil to give a series of highly pigmented pastes of substantially equal consistency or spreading rate. Each sample to be tested is prepared in the same fashion, the amount of oil being used being such as to give a paste of the same consistency or spreading rate as the standard. In the tests reported in this application, about 2.6 milliliters of oil was used to obtain the desired paste consistency. After the pastes have been prepared, equal amounts of a standard paste and the sample paste are spread side-by-side on a sheet of merit bond or equivalent 16 lb. paper free of optical brighteners by use of a 0.015" pull-down blade. The samples are visually compared one to three minutes after preparation in a color booth illuminated by six 30-watt G.E. Daylight Fluorescent light tubes, and assigned brightness values, and color and tone designations as described above.

EXAMPLE A

Slag ore from Quebec Iron and Titanium Corp. at Sorel, Quebec, Canada (QIT slag) was digested with concentrated (93%) sulfuric acid. The digestion cake was dissolved and the undigested portions were filtered out. The filtrate was concentrated, clarified, and filtered to remove all nonsoluble impurities. A titania hydrolysate was precipitated from the solution, filtered, washed substantially free of iron, reslurried, boiled with $H_2SO_4$ between 10 and 40% on $TiO_2$ basis in the presence of a reducing agent such as titanous sulfate solution, zinc metal, or aluminum powder, filtered, washed free of iron (to less than 50 ppm), and reslurried to produce hydrolysate for calcination.

EXAMPLE B

Following a process similar to that in Example A, ilmenite ore was digested in concentrated sulfuric acid and the digestion cake was dissolved and the undigested portions were filtered out. The iron ions in the filtrate were reduced to the ferrous state by reduction with scrap iron, the excess ferrous sulfate was crystallized out and the remaining liquor was treated as in Example A to produce a hydrolysate for calcination.

EXAMPLE C

Sufficient of the hydrolysate of Example A or B to yield 800 grams of calcined pigment was treated with $Sb_2O_3$ (N L Industries, "TMS" grade), $K_2O$ as a 210 gram per liter solution of KOH, and $P_2O_5$ as 115 gram per liter solution of $H_3PO_4$ in amounts sufficient to result in the concentrations shown for the calcined product. The treated hydrolysate was well stirred, loaded into a silica tube and rotary calcined in a muffle furnace in accordance with the following calcination schedule:

90 minutes at 650° C. muffle furnace temperature, then 30 minutes at 750° C. muffle furnace temperature, then 30 minutes at 850° C. muffle furnace temperature, then 30 minutes at 925° C. muffle furnace temperature, then b 30 minutes at 1000° C. muffle furnace temperature, then 60 minutes at 1050° C. muffle furnace temperature, then 60 minutes at 1100° C. muffle furnace temperature, then

EXAMPLE 1

In this example, titanium dioxide pigment of anatase crystal structure was prepared from titania slag containing very little niobium impurity (about 0.01% $Nb_2O_5$) to provide a basis for comparing products made from ilmenite [containing much more niobium impurity (in the range of about 0.05 to 0.30% $Nb_2O_5$)] in the subsequent examples. Hydrolysate from QIT slag, prepared as in Example A, was treated and calcined by the procedure of Example C. After 30 minutes at 925° C. of the calcination schedule, a two to five gram sample of calcined material was removed, ground in an agate mortar and pestle, and the product evaluated by the Color-in-Oil test procedure for brightness, color, and tone. This sampling and testing procedure was repeated every fifteen minutes until the tint tone of the material was in the range of Bl to Bl$_3$. The calcination was then halted by removal of the tube containing the product from the hot furnace. The product thus obtained had the chemical composition 0.01% $Nb_2O_5$; 0.29% $P_2O_5$; 0.25% $K_2O$; 1.0% $Sb_2O_3$; and the balance substantially $TiO_2$ in tha anatase crystal form and a brightness, color, and tone rating of 100=. Repetition of this procedure with somewhat more phosphoric acid and potassium hydroxide addition yielded a product having the chemical composition 0.01% $Nb_2O_5$; 0.31% $P_2O_5$; 0.30% $K_2O$; 1.0% $Sb_2O_3$; and the balance substantially $TiO_2$ in the anatase crystal form and a brightness, color, and tone rating of 97.5 Bl$_1$. Both of these products are commercially acceptable pigments.

EXAMPLE 2

Example 1 was repeated using an ilmenite ore (from the United States) instead of the titania slag. Hydrolysate from an ilmenite ore containing appreciable niobium oxide, prepared as in Example B, was treated and calcined by the procedure in Example C using the procedure of Example 1 to determine when calcination was completed. The product thus obtained had the chemical composition 0.08% $Nb_2O_5$; 0.30% $P_2O_5$; 0.24% $K_2O$; 1.0% $Sb_2O_3$; and the balance substantially $TiO_2$ in the anatase crystal form and had a brightness, color, and tone rating (by the Color-in-Oil test procedure) of 99.3Y$_1$. Repetition of this procedure with another sample of the same ilmenite ore gave a product having the chemical composition 0.09% $Nb_2O_5$; 0.28% $P_2O_5$; 0.26% $K_2O$; 1.0% $Sb_2O_3$; and the balance substantially $TiO_2$ in the anatase crystal form and a brightness, color, and tone rating (by the Color-in-Oil test procedure) of 99Y$_1$. Both of these products, chemically the same as the products of Example 1, except for the very important niobium oxide impurity resulting from the use of ilmenite ore as the raw material, were commercially unacceptable because of the trace yellowness possessed thereby.

EXAMPLE 3

Example 2 was repeated with another sample of the same ilmenite ore except that more phosphoric acid was added prior to calcination with the expectation that the presence of more $P_2O_5$ during calcination would result in smaller particles having a bluish cast or tone. The product thus obtained had the chemical composition 0.11% $Nb_2O_5$; 0.34% $P_2O_5$; 0.26% $K_2O$; 1.0% $Sb_2O_3$; and the balance substantially $TiO_2$ in the anatase crystal form and a brightness, color, and tone rating (by the Color-in-Oil test procedure) of 98.8Y$_{1.22}$. Thus, this product did not live up to expectations, and was slightly yellower than the commercially unacceptable products of Example 2.

EXAMPLE 4

Since alumina is considered to be a color stabilizing agent, Example 2 was repeated using the same ilmenite ore and adding aluminum sulfate to the hydrolysate prior to calcination. The product thus obtained had the chemical composition 0.09% $Nb_2O_5$; 0.06% $Al_2O_3$; 0.30% $P_2O_5$; 0.26% $K_2O$; 1.0% $Sb_2O_3$; and the balance substantially $TiO_2$ in the anatase crystal form and a brightness, color, and tone rating (by the Color-in-Oil test procedure) of 99Y$_1$. Thus, this product was still commercially unacceptable as were the products of Example 2.

EXAMPLE 5

In accordance with the present invention, Example 3 was repeated using the same ilmenite ore but adding about twice as much potassium hydroxide to the hydrolysate prior to calcination. The product thus obtained had the chemical composition 0.09% $Nb_2O_5$; 0.34% $P_2O_5$; 0.51% $K_2O$; 1.0% $Sb_2O_3$; and the balance substantially $TiO_2$ in the anatase crystal form and a brightness, color, and tone rating (by the Color-in-Oil test procedure) of 100=. Repetition of this procedure using a different ilmenite ore (from Australia) containing about twice as much niobium oxide impurity yielded a product having the chemical composition 0.19% $Nb_2O_5$; 0.34% $P_2O_5$; 0.51% $K_2O$; 1.0% $Sb_2O_3$; and the balance substantially $TiO_2$ in the anatase crystal form and a brightness, color, and tone rating (by the Color-in-Oil test procedure) of 100B$_1$. Thus, these products were as commercially acceptable as the products made from titania slag in Example 1 despite the presence of substantial amounts of niobium oxide impurity.

EXAMPLE 6

To convert the calcined products of the previous examples to useful fiber delustrants, it is important that they be provided with a surface coating of hydrous metal oxide, such as alumina, to improve the durability of the pigment, to improve the dispersibility of the pigment in the spin dope from which fibers are spun, and to retard the yellowing which might occur with extended aging of products containing such pigments. After calcination, each of the products of the previous examples was micropulverized, slurried in water to about 1.20 specific gravity, and sufficient 10% aqueous sodium hydroxide solution was added to give a pH of 10.0±0.2. The slurry was pebble milled for two hours, screened through a 325 mesh stainless steel screen to remove grit, and flocculated with sufficient sulfuric acid to yield a pH of 3.5 to 5.5 when sufficient sodium aluminate was added to yield 1.7 to 1.9% $Al_2O_3$ as a hydrous oxide surface coating. After the sodium aluminate was added, the material was heated to 70° C., aged for two hours, filtered on a Buchner funnel, and washed with ten times the pigment weight of water. After drying overnight at 115° C., the pigment was screened through a 10 mesh screen and micronized in a 4" lab micronizer with 135 psig superheated steam at 245° C. The pigment containing a coating of hydrous alumina was collected in a cyclone.

To test the coated pigment products made in Example 6, cellulose acetate chips containing 4.0 grams pigment dispersed in 200.0 grams cellulose acetate were prepared by milling the pigment into the cellulose acetate on a mill having a front roll at 335°–340° F. and a rear roll at 280°–285° F. then pressing in a 100 mil cavity mold to form test chips. The test chips, after cooling to room temperature, were placed in a spectrophotometer and the reflectance measured with reference to a calibrated working standard. The reflectance curves of the various $TiO_2$ pigments of Examples 1 to 5, coated with hydrous alumina by the process of Example 6 showed the following results.

The first pigment of Example 1 showed a reflectance slightly higher (about 1%) than the standard in the wavelengths 400–500 mµ and matched the standard in the wavelengths 500–700 mµ. The second pigment of Example 1 showed a reflectance higher (about 2%) than the standard in the wavelengths 400–500 mµ and slightly higher (about 0.5%) than the standard in the wavelengths 500–700 mµ. This is representative of commercially acceptable product.

The second pigment of Example 2 showed a reflectance lower (about 2%) than the standard in all wavelengths 400–700 mµ. The pigment of Example 3 showed a reflectance about equal to the standard in the wavelengths 400–500 mµ but slightly below (about 1–2%) the standard in the wavelengths 500–700 mµ. These samples are commercially unacceptable.

The pigment of Example 4 nearly matched the standard in all wavelengths 400–700 mµ. As compared to the samples from Example 1, however, it will be seen that it is deficient in reflectance in the lower wavelengths, giving it a yellowish cast compared to the $TiO_2$ pigment made from titania slag.

The first pigment of Example 5 showed a reflectance higher (about 1–3%) than the standard in the wavelengths 400–500 mµ and matched the standard in the wavelengths 500–700 mµ. Thus, this pigment made from ilmenite was commercially acceptable as an equivalent to the pigments of Example 1 made from titania slag. The second pigment of Example 5 showed a reflectance higher (about 2–4%) than the standard in the wavelengths 400–500 mµ and slightly higher (about 1%) than the standard in the wavelengths 500–700 Mµ. This pigment made from ilmenite was even superior to the pigments of Example 1 made from titania slag.

In a similar manner, the $TiO_2$ pigment can be prepared from blends of titanium sulfate liquors from ilmenite and titania slag ore or other conventional calcination processes can be used, and the results of the present invention are still obtained, viz., titanium dioxide pigment in the anatase form containing appreciable niobium oxide impurity and still having pigment quality at least as good as that made from substantially niobium-free titania slag ore.

We claim:

1. A titanium dioxide pigment of anatase crystal structure containing 0.05 to 0.3% $Nb_2O_5$, 0.4 to 0.6% $K_2O$, 0.8 to 1.2% $Sb_2O_3$, 0.2 to 0.4% $P_2O_5$, and the balance substantially $TiO_2$; the particles of said pigment having a surface coating of hydrous metal oxide.

2. A pigment as defined in claim 1 wherein said metal oxide is alumina.

3. A titanium dioxide pigment of anatase crystal structure containing 0.05 to 0.3% $Nb_2O_5$, 0.4 to 0.6% $K_2O$, 0.8 to 1.2% $Sb_2O_3$, 0.2 to 0.4% $P_2O_5$, and the balance essentially $TiO_2$; the particles of said pigment having a surface coating of hydrous metal oxide.

4. A pigment as defined in claim 3 wherein said metal oxide is alumina.

* * * * *